United States Patent
Yamamoto et al.

(10) Patent No.: US 9,905,994 B2
(45) Date of Patent: Feb. 27, 2018

(54) OPTICAL FIBER AND OPTICAL TRANSPORT SYSTEM

(71) Applicant: SUMITOMO ELECTRIC INDUSTRIES, LTD., Osaka-shi, Osaka (JP)

(72) Inventors: Yoshinori Yamamoto, Yokahama (JP); Masaaki Hirano, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/361,629

(22) Filed: Nov. 28, 2016

(65) Prior Publication Data
US 2017/0077670 A1    Mar. 16, 2017

Related U.S. Application Data

(63) Continuation of application No. PCT/JP2015/066775, filed on Jun. 10, 2015.

(30) Foreign Application Priority Data
Jun. 13, 2014    (JP) .................... 2014-122100

(51) Int. Cl.
*H01S 3/067* (2006.01)
*G02B 6/02* (2006.01)
(Continued)

(52) U.S. Cl.
CPC .......... *H01S 3/302* (2013.01); *G02B 6/02014* (2013.01); *G02B 6/036* (2013.01);
(Continued)

(58) Field of Classification Search
CPC . H01S 3/302; H01S 3/06754; G02B 6/02014; G02B 6/02019
See application file for complete search history.

(56) References Cited

U.S. PATENT DOCUMENTS 7,929,818 B1    4/2011 Bickham et al.
2011/0044700 A1*  2/2011 Sasaoka .............. G02B 6/02019
                                                  398/183
(Continued)

FOREIGN PATENT DOCUMENTS

JP    2005-202440 A    7/2005
JP    2011-039109 A    2/2011
(Continued)

OTHER PUBLICATIONS

Rottwitt et al., "Scaling of the Raman Gain Coefficient: Applications to Germanosilicate Fibers", Journal of Lightwave Technology, vol. 21, No. 7, pp. 1652-1662 (2003).*
(Continued)

*Primary Examiner* — Eric Bolda
(74) *Attorney, Agent, or Firm* — Drinker Biddle & Reath LLP

(57) ABSTRACT

The present invention relates to an optical fiber which can improve OSNR in an optical transmission system in which Raman amplification and an EDFA are combined. With respect to the optical fiber, a predetermined conditional formula is satisfied by an effective area $\text{Aeff}_{1450}$ [$\mu m^2$] at a wavelength of 1450 nm, a transmission loss $\alpha_{1450}$ [/km] at a wavelength of 1450 nm, and a transmission loss $\alpha_{1550\_dB}$ [dB/km] at a wavelength of 1550 nm. Further, with respect to the optical fiber, another predetermined conditional formula is satisfied by an effective area $\text{Aeff}_{1550}$ [$\mu m^2$] at a wavelength of 1550 nm, and a transmission loss $\alpha_{1550}$ [/km] at a wavelength of 1550 nm.

11 Claims, 9 Drawing Sheets

|  | Δ0 [%] | Δ1 [%] | Δ2 [%] | 2a [μm] | 2b [μm] | b/a |
|---|---|---|---|---|---|---|
| COMPARATIVE EXAMPLE 1 | 0.35 | 0.35 | - | 8.4 | - | - |
| COMPARATIVE EXAMPLE 2 | 0.72 | 0.72 | 0.07 | 4.1 | 15.6 | 3.8 |
| SAMPLE 1 | 0.08 | 0.42 | - | 9.2 | - | - |
| SAMPLE 2 | 0.02 | 0.38 | -0.02 | 9.3 | 40.0 | 4.3 |
| SAMPLE 3 | 0.06 | 0.26 | -0.08 | 12.1 | 52.0 | 4.3 |
| SAMPLE 4 | 0.01 | 0.23 | -0.10 | 12.0 | 50.4 | 4.2 |
| SAMPLE 5 | 0.00 | 0.23 | -0.08 | 13.3 | 46.6 | 3.5 |
| SAMPLE 6 | 0.01 | 0.19 | -0.08 | 14.3 | 48.6 | 3.4 |

(51) Int. Cl.
    *H01S 3/30*     (2006.01)
    *G02B 6/036*     (2006.01)
    *H04B 10/255*     (2013.01)
    *H04B 10/291*     (2013.01)
    *H04B 10/25*     (2013.01)
    *H01S 3/16*     (2006.01)

(52) U.S. Cl.
    CPC ....... H01S 3/06754 (2013.01); H04B 10/255 (2013.01); H04B 10/291 (2013.01); *G02B 6/02019* (2013.01); *G02B 6/03627* (2013.01); *H01S 3/06729* (2013.01); *H01S 3/06758* (2013.01); *H01S 3/1608* (2013.01); *H04B 10/2916* (2013.01)

(56) References Cited

U.S. PATENT DOCUMENTS

2011/0211788 A1*   9/2011   Yamamoto ......... G02B 6/02019
                                                                           385/28
2011/0222863 A1   9/2011   Bickham et al.
2015/0226914 A1   8/2015   Hirano et al.

FOREIGN PATENT DOCUMENTS

JP     2011-197667 A   10/2011
JP     2014-067020     4/2014

OTHER PUBLICATIONS

International Preliminary Report on Patentability dated Dec. 22, 2016 for PCT/JP2015/066775.
Y. Yamamoto et al., "Large Aeff Pure-Silica-Core Fiber with Low Similar Splice Loss for Terrestrial Transmission Lines", Optical Fiber Communications Conference and Exhibition (OFC), Mar. 2014, p. 1-p. 3.
Y. Yamamoto et al., "OSNR Performance of Aeff Enlarged Low-Attenuation Pure-Silica-Core Fiber for Repeaterless Transmission with Distributed Raman Amplification", 2008 Nen IEICE Communications Society Conference Koen Ronbunshu 2, Sep. 2, 2008, p. 220.

* cited by examiner

Fig.2

| | Aeff1550 [μm²] | Aeff1450 [μm²] | α1550_dB [dB/km] | α1450_dB [dB/km] | λc [nm] | BENDING LOSS (*1) [dB/m] | Aeff1450·α1450 [μm²/km] | 22/(α1550_dB ×f(00-12) [μm²/km] | 0.44/α1550_dB [μm²/km] | Aeff1550·α1550 [μm²/km] | CONDITION 1 (*2) | CONDITION 2 (*2) | CONDITION 3 (*2) |
|---|---|---|---|---|---|---|---|---|---|---|---|---|---|
| COMPARATIVE EXAMPLE 1 | 80 | 75 | 0.190 | 0.229 | 1245 | 6.0 | 3.93 | 3.14 | 2.32 | 3.50 | N | Y | Y |
| COMPARATIVE EXAMPLE 2 | 45 | 38 | 0.200 | 0.240 | 1350 | 0.3 | 2.09 | 2.75 | 2.20 | 2.07 | Y | N | N |
| SAMPLE 1 | 78 | 73 | 0.170 | 0.214 | 1480 | 0.1 | 3.57 | 4.40 | 2.59 | 3.05 | Y | Y | Y |
| SAMPLE 2 | 78 | 73 | 0.155 | 0.197 | 1392 | 0.1 | 3.28 | 6.29 | 2.84 | 2.78 | Y | Y | Y |
| SAMPLE 3 | 112 | 106 | 0.162 | 0.203 | 1523 | 0.6 | 4.95 | 5.24 | 2.72 | 4.18 | Y | Y | Y |
| SAMPLE 4 | 112 | 106 | 0.155 | 0.197 | 1470 | 1.2 | 4.79 | 6.29 | 2.84 | 4.00 | Y | Y | Y |
| SAMPLE 5 | 130 | 122 | 0.155 | 0.197 | 1490 | 2.2 | 5.53 | 6.29 | 2.84 | 4.64 | Y | Y | Y |
| SAMPLE 6 | 150 | 142 | 0.150 | 0.197 | 1469 | 8.2 | 6.41 | 7.38 | 2.94 | 5.17 | Y | Y | Y |

*1) BENDING LOSS AT A WAVELENGTH OF 1550 nm FOR A DIAMETER OF 20 mm
*2) Y: CONDITION SATISFIED, N: CONDITION NOT SATISFIED

Fig.3

| | $G_R$ [dB] | $G_E$ [dB] | $P_{sig\_max}$ [dB] | OSNR [dB] | ΔOSNR [dB] (*3) |
|---|---|---|---|---|---|
| COMPARATIVE EXAMPLE 1 | 6.0 | 13.0 | -1.4 | 35.8 | - |
| COMPARATIVE EXAMPLE 2 | 11.2 | 8.8 | -3.8 | 34.7 | -1.2 |
| SAMPLE 1 | 6.3 | 10.7 | -1.7 | 37.6 | 1.8 |
| SAMPLE 2 | 6.9 | 8.6 | -2.1 | 39.0 | 3.2 |
| SAMPLE 3 | 4.5 | 11.7 | -0.3 | 39.0 | 3.1 |
| SAMPLE 4 | 4.7 | 10.8 | -0.5 | 39.6 | 3.8 |
| SAMPLE 5 | 4.0 | 11.5 | 0.1 | 39.9 | 4.1 |
| SAMPLE 6 | 3.5 | 11.5 | 0.6 | 40.7 | 4.8 |

*3) IMPROVEMENT AMOUNT IN OSNR COMPARED WITH SMF OF COMPARATIVE EXAMPLE 1

Fig.4

| | Δ0 [%] | Δ1 [%] | Δ2 [%] | 2a [μm] | 2b [μm] | b/a |
|---|---|---|---|---|---|---|
| COMPARATIVE EXAMPLE 1 | 0.35 | 0.35 | - | 8.4 | - | - |
| COMPARATIVE EXAMPLE 2 | 0.72 | 0.72 | 0.07 | 4.1 | 15.6 | 3.8 |
| SAMPLE 1 | 0.08 | 0.42 | - | 9.2 | - | - |
| SAMPLE 2 | 0.02 | 0.38 | -0.02 | 9.3 | 40.0 | 4.3 |
| SAMPLE 3 | 0.06 | 0.26 | -0.08 | 12.1 | 52.0 | 4.3 |
| SAMPLE 4 | 0.01 | 0.23 | -0.10 | 12.0 | 50.4 | 4.2 |
| SAMPLE 5 | 0.00 | 0.23 | -0.08 | 13.3 | 46.6 | 3.5 |
| SAMPLE 6 | 0.01 | 0.19 | -0.08 | 14.3 | 48.6 | 3.4 |

…

OPTICAL FIBER AND OPTICAL TRANSPORT SYSTEM

CROSS-REFERENCE TO RELATED APPLICATIONS

This application is a continuation application of PCT/JP2015/066775 claiming the benefit of priority of the Japanese Patent Application No. 2014-122100 filed on Jun. 13, 2014, the entire contents of which are incorporated herein by reference.

TECHNICAL FIELD

The present invention relates to an optical fiber and an optical transmission system.

BACKGROUND ART

In an optical transmission system using the digital coherent detection technology, it is important to improve an optical signal-to-noise ratio (OSNR). By improving the OSNR, it is possible to increase transmission capacity of an optical transmission system and to increase a transmittable distance and a repeater interval (span length).

To improve the OSNR, it is effective to reduce transmission loss of a transmission optical fiber, and to decrease nonlinearity by increasing an effective area Aeff of the optical fiber so as to reduce optical power density in the core.

Standard single-mode optical fiber compliant to ITU-T G.652 recommendation has a transmission loss of approximately 0.19 dB/km at a wavelength of 1550 nm and Aeff of approximately 80 µm² at a wavelength of 1550 nm. Compared with this fiber, the optical fiber described in Patent Literature 1 has a transmission loss of 0.18 dB/km or less at a wavelength of 1550 nm and Aeff of 110 µm² or more at a wavelength of 1550 nm.

In general, in an optical transmission system, optical fibers are deployed between a transmitter and the first stage repeater, between a repeater and the next stage repeater, and the final stage repeater and a receiver, and transmit an optical signal from the transmitter to the receiver. Typically, the optical signal is amplified by an Er-doped optical fiber amplifier (EDFA) disposed in a repeater so that transmission loss caused between repeaters (one span) is completely compensated.

On the other hand, in order to improve the OSNR of the optical transmission system, Raman amplification, which is excellent in noise characteristics, is used in combination with an EDFA in some cases. FIG. 1A is a diagram showing a configuration of an optical transmission system 1 in which Raman amplification and the EDFA are used in combination. The optical transmission system 1 includes a transmitter 10, a repeater 20, and a receiver 30, and between these devices are deployed optical fibers 40 as optical fiber transmission lines. Each repeater 20 includes an EDFA 21 and a pumping light source 22 for Raman amplification. A Raman amplifier comprises the pumping light source 22 for Raman amplification in each repeater 20 and the optical fiber 40 through which pumping light for Raman amplification emitted from the light source 22 for Raman amplification propagates.

The light source 22 for Raman amplification in each repeater 20 amplifies signal light by causing the pumping light to propagate in the same or opposite direction of the propagation direction of the signal light and thus to create stimulated Raman scattering in the transmission optical fiber 40. A gain of the Raman amplification in an optical fiber made of silica-based glass has a peak at a wavelength which is approximately 100 nm longer than the pumping light wavelength. For example, in order to Raman-amplify the signal light is in the C band (wavelength of 1530 nm to 1565 nm), the pumping light wavelength is set near a wavelength of 1450 nm in many cases.

However, because Raman amplification uses stimulated Raman scattering, which is one of nonlinear phenomena, there is a problem that amplification efficiency decreases as Aeff is increased.

Patent Literature 2 describes an optical fiber and an optical transmission system which improve OSNR in a wavelength division multiplexed optical transmission system which uses Raman amplification and is for a long repeating distance. Further, this document describes that Aeff at a wavelength of 1550 nm must be 150 µm² or less in order to keep the pumping light power in a practical range (some watts or less).

Patent Literature 3 describes the relationship between transmission loss and Aeff at a wavelength of 1550 nm, and the relationship needs to be satisfied to improve the OSNR and at the same time to suppress increase in power of pumping light for Raman amplification in the optical transmission system using Raman amplification.

CITATION LIST

Patent Literature

Patent Literature 1: Japanese Unexamined Patent Publication No. 2005-202440
Patent Literature 2: Japanese Unexamined Patent Publication No. 2011-039109
Patent Literature 3: Japanese Unexamined Patent Publication No. 2011-197667

SUMMARY OF INVENTION

Technical Problem

The inventors have studied about a conventional optical transmission system using Raman amplification, and as a result, have discovered the following issues. That is, Patent Literature 2 does not disclose an optical fiber for improving OSNR in an optical transmission system in which Raman amplification and an EDFA are combined. Patent Literature 3 assumes that transmission loss is compensated all by Raman amplification, and does not give consideration to optical fiber characteristics at a pumping light wavelength.

The present invention has been made to solve the above issues, and an object of the present invention is to provide an optical fiber which can improve OSNR in an optical transmission system in which Raman amplification and an EDFA are combined. Further, an object of the present invention is to provide an optical transmission system which includes: an optical fiber transmission line using such an optical fiber; a Raman amplifier; and an EDFA and which can improve OSNR.

Solution to Problem

An optical fiber according to the present embodiment includes: a core extending along a predetermined axis; and a cladding provided on an outer periphery of the core, wherein each of the core and the cladding is configured to satisfy the following formula, when $\text{Aeff}_{1450}$ [µm²] is an effective area at a wavelength of 1450 nm; $\alpha_{1450}$ [/km] is a transmission loss at a wavelength of 1450 nm; and $\alpha_{1550\_dB}$ [dB/km] is a transmission loss at a wavelength of 1550 nm.

$$\frac{0.44}{\alpha_{1550\_dB}} < Aeff_{1450} \cdot \alpha_{1450} < \frac{22}{\alpha_{1550\_dB} \cdot 100 - 12} \quad (1)$$

Advantageous Effects of Invention

The present invention can improve the OSNR in an optical transmission system in which Raman amplification and an EDFA are combined.

BRIEF DESCRIPTION OF DRAWINGS

FIG. 2 is a table which summarizes specifications of each of samples of an optical fiber according to a present embodiment and comparative examples.

FIG. 3 is a table which summarizes specifications of each of the samples of an optical fiber according to the present embodiment and the comparative examples.

FIG. 4 is a table which summarizes specifications of each of the samples of an optical fiber according to the present embodiment and the comparative examples.

DESCRIPTION OF EMBODIMENTS

Figure 1A:
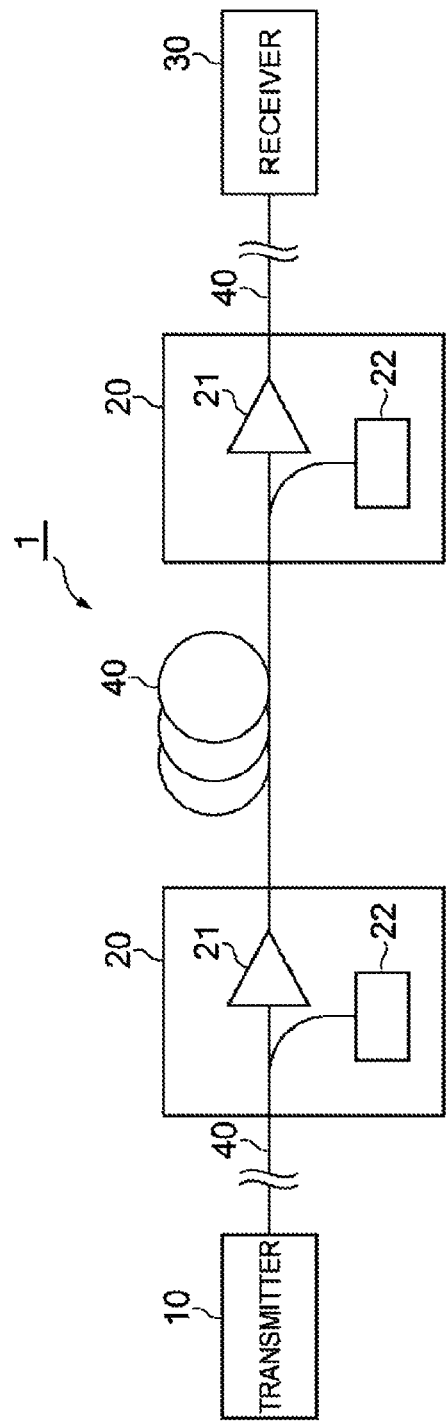
FIGS. 1A and 1B are diagrams showing an configuration of an optical transmission system 1 which uses Raman amplification and an EDFA in combination and showing a signal light power diagram in one span.

Description of an Embodiment of the Present Invention

First, practical aspects of the present invention will be listed and described.

As a first aspect of the present embodiment, the optical fiber includes a core extending along a predetermined axis and a cladding provided on an outer periphery of the core. In particular, each of the core and the cladding is configured to satisfy the above Formula (1), when an effective area at a wavelength of 1450 nm is $Aeff_{150}$ [μm²], a transmission loss at a wavelength of 1450 nm is $\alpha_{1450}$ [/km], and a transmission loss at a wavelength of 1550 nm is $\alpha_{1550\_dB}$ [dB/km]. Note that the suffix "dB" of the transmission loss α represents decibel display [dB/km] ($\alpha_{dB} = 10\alpha \times \log_{10}(e)$) of the transmission loss α [/km].

As a second aspect applicable to the above first aspect, each of the core and the cladding may be configured to satisfy the following Formula (2), when the effective area at a wavelength of 1550 nm is $Aeff_{1550}$ [μm²], and the transmission loss at a wavelength of 1550 nm is $\alpha_{1550}$ [/km].

$$Aeff_{1550} \cdot \alpha_{1550} > 2.2 \quad (2)$$

As a third aspect applicable to at least any one of the above first and second aspects, it is preferable that a transmission loss $\alpha_{1550\_dB}$ at a wavelength of 1550 nm be 0.17 dB/km or less. Further, as a fourth aspect applicable to at least any of one the above first to third aspects, it is preferable that an effective area $Aeff_{1550}$ at a wavelength of 1550 nm be 70 μm² to 160 μm².

As a fifth aspect applicable to at least any one of the above first to fourth aspects, it is preferable that a relative refractive index difference of the core with respect to pure silica be −0.1% to +0.1%.

As a sixth aspect applicable to at least any one of the above first to fifth aspects, it is preferable that a transmission loss $\alpha_{1450\_dB}$ at a wavelength of 1450 nm is 0.19 to 0.22 dB/km or less. Further, as a seventh aspect applicable to at least any one of the above first to sixth aspects, it is preferable that an effective area $Aeff_{1450}$ at a wavelength of 1450 nm be 60 μm² to 140 μm².

As an eighth aspect applicable to at least any one of the above first to seventh aspects, it is preferable that a relative refractive index difference of the core with respect to a reference area of the cladding be 0.18 to 0.45% and that a diameter of the core be 9 μm to 15 μm. Note that, in the present specification, when the cladding is configured with a single layer, the whole cladding is the reference area; however, when the cladding is configured with a plurality of layers, the outermost layer of the layers constituting the cladding is defined as the reference area.

As a ninth aspect applicable to at least any one of the above first to eighth aspects, it is preferable that a fiber cutoff wavelength be 1600 nm or less. Further, as a tenth aspect applicable to at least any one of the above first to ninth aspects, the cladding may be configured, as described above, with an inner cladding surrounding an outer periphery of the core and an outer cladding surrounding the outer periphery of the inner cladding. In this configuration, it is preferable that a refractive index of the outer cladding be smaller than the refractive index of the core and be greater than the refractive index of the inner cladding. As an eleventh aspect applicable to at least any one of the above first to tenth aspects, it is preferable that the ratio b/a of a diameter 2a of the core to an outer diameter 2b of the inner cladding be 3.0 to 5.0.

Further, an optical transmission system according to the present embodiment includes: an optical fiber transmission line using an optical fiber according to any of the above first to eleventh aspects; an Er-doped optical fiber amplifier which is configured to amplify signal light transmitted through the optical fiber transmission line; and a Raman amplifier which is configured to Raman-amplify the signal light transmitted through the optical fiber transmission line. In particular, the optical transmission system satisfies the following Formula (3), when the effective area of the above optical fiber at a wavelength of the pumping light for Raman amplification is $Aeff_P$ [μm²], the transmission loss of the above optical fiber transmission line at the wavelength of the pumping light for Raman amplification is $\alpha_P$ [1/km] ([1/km] and [/km] represent the same unit), a transmission loss of the above optical fiber transmission line at a signal light wavelength is $\alpha_{SdB}$ [dB/km], a span length of the above optical fiber transmission line is L [km], and a power of pumping light for Raman amplification is $P_{Pump}$ [mW].

$$\frac{0.11}{Aeff_P \cdot \alpha_P} \cdot P_{Pump} < \quad (3)$$

$$\alpha_{SdB} \cdot L - \frac{0.11}{Aeff_P \cdot \alpha_P} \cdot P_{Pump} < 0.19L - 0.028 P_{Pump} - 1$$

Details of the Embodiment of the Invention of the Present Application

Hereinafter, a description will be given in detail on specific configurations of an optical fiber according to the present embodiment and an optical transmission system including the optical fiber with reference to the accompanying drawings. Note that, the present invention is not limited to these examples, and it is intended that the present invention is defined by the scope of the claims and includes all modifications within the meaning and scope equivalent to the claims.

Figure 1B:
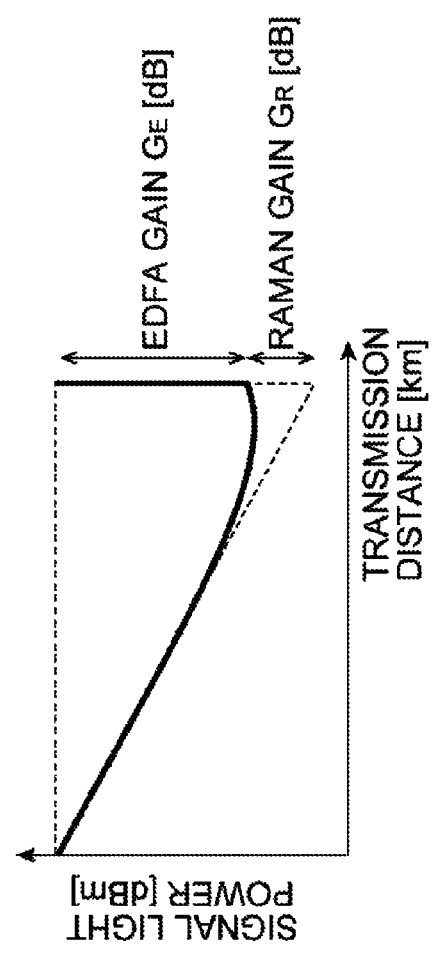

An optical transmission system according to the present embodiment includes the configuration shown in the above-described FIG. 1A, and the optical fiber according to the present embodiment is applicable, as an optical fiber transmission line, to the optical fiber 40 of the optical transmission system 1 shown in FIG. 1A. Further, FIG. 1B shows a signal light power diagram in one span when pumping light for Raman amplification is made to propagate in the one span (a repeater section on which the optical fiber 40 is deployed) of the optical fiber transmission line in the direction opposite to the propagation direction of the signal light. In the optical transmission system 1 of FIG. 1A, the signal light obtains a Raman gain of $G_R$ [dB] during propagation through the optical fiber 40 deployed on each span. Further, the signal light obtains an EDFA gain of $G_E$ [dB] by the EDFA 21 disposed on the span's output end. Such a configuration completely compensates the transmission loss of the signal light caused in the one span.

First, a description will be given on a gain $G_R$ and an ASE noise power $P_{ASE\_Raman}$ of the Raman amplification. The gain $G_R$ [dB] which the signal light obtains by the Raman amplification for one span is expressed by the following Formula (4). In the formula, $g_R$ [×10$^{-14}$ m/W] is Raman gain coefficient, $Aeff_P$ [µm$^2$] is an effective area at a pumping light wavelength, $Leff_P$ [km] is an effective length at a pumping light wavelength, and $P_{Pump}$ [mW] is a power of input pumping light.

$$G_R[dB] = 10\log\left[\exp\left(\frac{g_R}{Aeff_P} \cdot Leff_P \cdot P_{Pump}\right)\right] \approx \frac{0.11}{Aeff_P \cdot \alpha_P} \cdot P_{Pump} \quad (4)$$

The following Formula (5) represents $Leff_P$, when a repeater interval (span length) is represented by L [km], and a transmission loss at a pumping light wavelength is represented by $\alpha_P$ [1/km]. In the case that L is sufficiently long (some ten kilometers or more), $Leff_P$ can be approximated by the following Formula (6).

$$Leff_P=[1-\exp(-\alpha_P L)]/\alpha_P \quad (5)$$

$$Leff_P \sim 1/\alpha_P \quad (6)$$

The value $g_R$ is determined substantially by material of the core, and in the case of a pure silica core fiber, in which substantially no impurity is added to the core, $g_R$ is about 2.6 [×10$^{-14}$ In/W] and approximately constant.

Further, the following Formula (7) represents an ASE (Amplified Spontaneous Emission) noise power $P_{ASE\_Raman}$ [mW] caused by Raman amplification. In the formula, h=6.63×10$^{-34}$ [Js] is Planck's constant, ν is a light frequency and is about 194 THz, Δν is a noise band and is, for example, about 12.5 GHz, and $NF_R$ is a noise figure of the Raman amplification.

$$P_{ASE\_Raman}=h\nu\Delta\nu\cdot NF_R\cdot(G_R-1) \quad (7)$$

Next, a description will be given on a gain $G_E$ and an ASE noise power $P_{ASE\_EDFA}$ of the EDFA. If it is assumed that the transmission loss in one span is completely compensated by the Raman amplification and the EDFA, the gain $G_E$ [dB] to be obtained by the EDFA is expressed by the following Formula (8), in which the Raman amplification gain is substituted from the span total loss. In the formula, $\alpha_{SdB}$ [dB/km] is a transmission loss at the signal light wavelength.

$$G_E[dB] = \alpha_{SdB} \cdot L - G_R[dB] \approx \alpha_{SdB} \cdot L - \frac{0.11}{Aeff_P \cdot \alpha_P} \cdot P_{Pump} \quad (8)$$

Further, the ASE noise power $P_{ASE\_EDFA}$ [mW] caused by the EDFA is expressed by the following Formula (9). In the formula, $NF_E$ is a noise figure of the EDFA and is generally about 5 to 6 dB.

$$P_{ASE\_EDFA}=h\nu\Delta\nu\cdot NF_E\cdot(G_E-1) \quad (9)$$

Next, a description will be given on a phase shift amount caused by self-phase modulation and an allowable input signal light power. One of nonlinear phenomena generated in an optical fiber includes self-phase modulation. Because the self-phase modulation shifts the phase of the signal light and thus deteriorates transmission performance, it is necessary to keep the self-phase modulation to an allowable value or less in the optical transmission system. The following Formula (10) represents a phase shift amount $\phi_{SPM}$ [rad], for one span, caused by self-phase modulation in the case of the optical transmission system not using Raman amplification. In the formula, $n_2$ [10$^{-20}$ m$^2$/W] is a nonlinear refractive index, λ [nm] is a wavelength, $Aeff_S$ [µm$^2$] is an effective area at a signal light wavelength, $P_{sig}$ [mW] is an input signal light power, and $\alpha_S$ [1/km] is a transmission loss at a signal light wavelength.

$$\phi_{SPM} = \frac{2\pi}{\lambda} \frac{n_2}{Aeff_S} Leff_S P_{Sig} \approx \frac{44\pi}{\lambda} \frac{1}{Aeff_S \alpha_S} P_{Sig} \quad (10)$$

When the repeater interval (span length) is represented by L [km], the following Formula (11) represents $Leff_S$. In the case that L is sufficiently long (some ten kilometers or more), $Leff_S$ can be approximated by the following Formula (12).

$$Leff_S=[1-\exp(-\alpha_S L)]/\alpha_S \quad (11)$$

$$Leff_S \sim 1/\alpha_S \quad (12)$$

The value $n_2$ is substantially determined by material of the core, and in the case of a pure silica core fiber, in which substantially no impurity is added to the core, is 2.2 [×10$^{-20}$ m$^2$/W] and approximately constant.

In the case that Raman amplification is used, a signal light power increases near the span's output end, and $\phi_{SPM}$ also increases accordingly. However, for example, in the case that signal light with an input signal light power of −2 dBm/ch is transmitted through an SSMF with a span length of 100 km, the difference of $\phi_{SPM}$ is as small as about 5% between the case of using Raman amplification with a pumping light power of 200 mW and the case of not using Raman amplification. Thus, the $\phi_{SPM}$ can be represented approximately by the above Formula (10) even when Raman amplification is used.

The $\phi_{SPM}$ allowable in an optical transmission system is, for example, 1 rad as an accumulated value all through the transmission line from the transmitter to the receiver. For example, in the case of a transmission line constituted by 50 spans, the allowable $\phi_{SPM}$ for one span is 0.02 rad. The maximum input signal light power $P_{sig\_max}$ [mW] with which the phase shift amount does not exceed a certain allowable amount $\phi_{SPM\_max}$ [rad.] is expressed by the following Formula (13).

$$P_{Sig\_max} = \frac{\lambda}{44\pi} Aeff_S \alpha_S \cdot \phi_{SPM\_max} \tag{13}$$

Next, an optical fiber which improves OSNR will be described. The following Formula (14) represents the OSNR in the optical transmission system in which Raman amplification and an EDFA are combined, in the case that the input signal power is set to $P_{sig\_max}$ so that the phase shift amount caused by the self-phase modulation is an allowable amount $\phi_{SPM\_max}$.

$$OSNR = \frac{P_{sig\_max}}{P_{ASE\_EDFA} + P_{ASE\_Raman} \cdot G_E} \tag{14}$$

In general, in the optical transmission system in which Raman amplification and an EDFA are combined, the gain of the EDFA is greater than the gain of the Raman amplification. Further, because the noise characteristics of the EDFA are inferior to those of the Raman amplification (which means that the noise figure $NF_E$ is greater than the noise figure $NF_R$), $P_{ASE\_EDFA}$ is greater than $P_{ASE\_Raman}$. Therefore, in order to improve the OSNR, it is effective to keep $P_{ASE\_EDFA}$ small.

As understood from the above Formula (9), $P_{ASE\_EDFA}$ increases linearly with respect to $G_E$; therefore, in order to reduce $P_{ASE\_EDFA}$, it is effective to keep $G_E$ small. In addition, by keeping $G_E$ small, it is possible to keep small a Raman ASE noise power $P_{ASE\_Raman} \cdot G_E$ after being amplified by the EDFA.

Here, assume the signal light wavelength to be 1550 nm, and assume the pumping light wavelength to be 1450 nm. The effective area at a wavelength of 1550 nm is represented by $Aeff_{1550}$ [μm$^2$], the transmission loss at a wavelength of 1550 nm is represented by $\alpha_{1550}$ [1/km] and $\alpha_{1550\_dB}$ [dB/km]. The effective area at a wavelength of 1450 nm is represented by $Aeff_{1450}$ [μm$^2$], and the transmission loss at a wavelength of 1450 nm are represented by $\alpha_{1450}$ [1/km] and $\alpha_{1450\_dB}$ [dB/km].

In order to keep $G_E$ small, it is preferable that Condition 1 represented by the following Formula (15) be satisfied. By satisfying Condition 1, $G_E$ represented by the above Formula (8), in which L=100 km and $P_{Pump}$=200 mW, is kept to be 12 dB or less. It is possible to reduce $G_E$ by 1 dB or more compared with a standard single mode fiber ($Aeff_{1550}$=80 μm$^2$, $Aeff_{1450}$=75 μm$^2$, $\alpha_{1550\_dB}$=0.19 dB/km, $\alpha_{1450}$=0.053/km, $g_R$=2.7×10$^{-14}$ m/W). That is, it is possible to reduce $P_{ASE\_EDFA}$ by 1 dB or more and thus to improve the OSNR.

$$Aeff_{1450} \cdot \alpha_{1450} < \frac{22}{\alpha_{1550\_dB} \cdot 100 - 12} \tag{15}$$

On the other hand, if $G_E$ is kept to be excessively small, $G_R$ increases to be comparable to $G_E$. In such a case, $P_{ASE\_Raman}$ becomes large, and as a result, the OSNR is deteriorated. To address this issue, it is preferable that Condition 2 represented by the following Formula (16) be satisfied. By satisfying Condition 2, the above Formula (4) and the above Formula (8) lead to the relationship $G_R < G_E$; thus, it is possible to suppress the increase in $P_{ASE\_Raman}$. As a result, the OSNR can be improved.

$$Aeff_{1450} \cdot \alpha_{1450} > \frac{0.44}{\alpha_{1550\_dB}} \tag{16}$$

Further, improving $P_{sig\_max}$ is effective in improving the OSNR. Therefore, the above Formula (13) shows that it is preferable that $Aeff_S \cdot \alpha_S$ be greater, and it is preferable that Condition 3 represented by the following Formula (17) be satisfied. By satisfying Condition 3, it is possible to make $P_{sig\_max}$ [mW] become 0.5 mW (−3 dBm) or more when $\phi_{SPM\_max}$=0.02 rad, and it is thus possible to improve the OSNR.

$$Aeff_{1550} \cdot \alpha_{1550} > 2.2 \tag{17}$$

FIGS. 2 to 4 are tables which summarize specifications of each of samples of the optical fiber according to the present embodiment and comparative examples. In the tables, comparative example 1 is a standard single mode fiber (SMF) compliant to ITU-T G.652. Comparative example 2 is a dispersion-shift fiber (DSF) compliant to ITU-T G.653.

FIG. 2 shows the characteristics of each of the samples of the optical fibers according to the present embodiment and the comparative examples, in other words, FIG. 2 shows: $Aeff_{1550}$; $Aeff_{1450}$; $\alpha_{1550\_dB}$; $\alpha_{1450\_dB}$; a fiber cutoff wavelength λc; a bending loss, with a diameter 20 mm, at a wavelength of 1550 nm; $Aeff_{1450} \cdot \alpha_{1450}$ (the left member of each of the above Formula (15) and the above Formula (16)); $22/(\alpha_{1550\_dB} \cdot 100-12)$ (the right member of the above Formula (15)), $0.44/\alpha_{1550\_dB}$ (the right member of the above Formula (16)); $Aeff_{1550} \cdot \alpha_{1550}$ (the left member of the above Formula (17)); and whether Conditions 1 to 3 are satisfied. The optical fibers of samples 1 to 6 satisfy all of Conditions 1 to 3.

FIG. 3 shows the transmission characteristics when the pumping light power is set to 200 mW and when the signal light is transmitted through the optical fiber transmission line with a span length 100 km for each of the samples of the optical fibers according to the present embodiment and the comparative examples. The OSNRs of the optical fibers of Samples 1 to 6 can be improved by 1.5 dB or more compared with the SMF.

Figure 5:
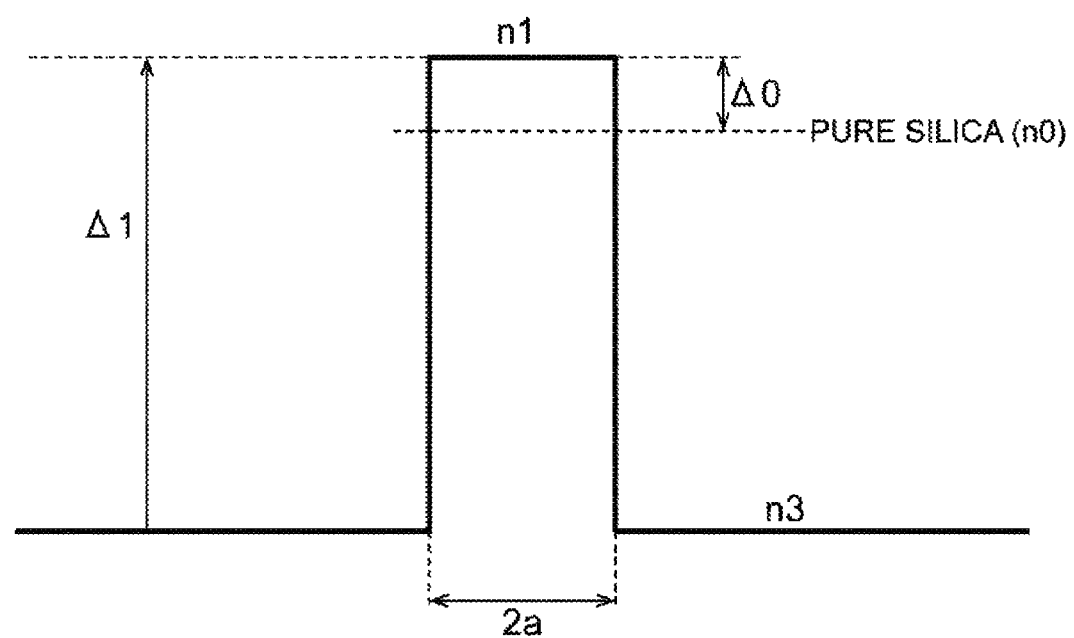
FIG. 5 is a diagram showing an example of a refractive index profile applicable to an optical fiber according to the present embodiment.

FIG. 4 shows construction parameters of each of the samples of the optical fibers according to the present embodiment and the comparative examples. FIG. 5 is a diagram showing a refractive index profile of an optical fiber of the embodiment. The optical fiber of the sample has: a core with a refractive index of n1 and a diameter 2a [μm]; and a cladding surrounding the core.

A relative refractive index difference of the core with respect to a refractive index n0 of pure silica is represented by Δ0 [%] (the following Formula (18)). The value Δ0 is preferably −0.1% to +0.1%. Condition 1 shows that it is preferable that $\alpha_{1450}$ be smaller, and it is effective in lowering $\alpha_{1450}$ to add substantially no impurity to the core through which most of the signal light power goes through.

$$\Delta 0[\%]=100\times(n1-n0)/n1 \quad (18)$$

Figure 6:
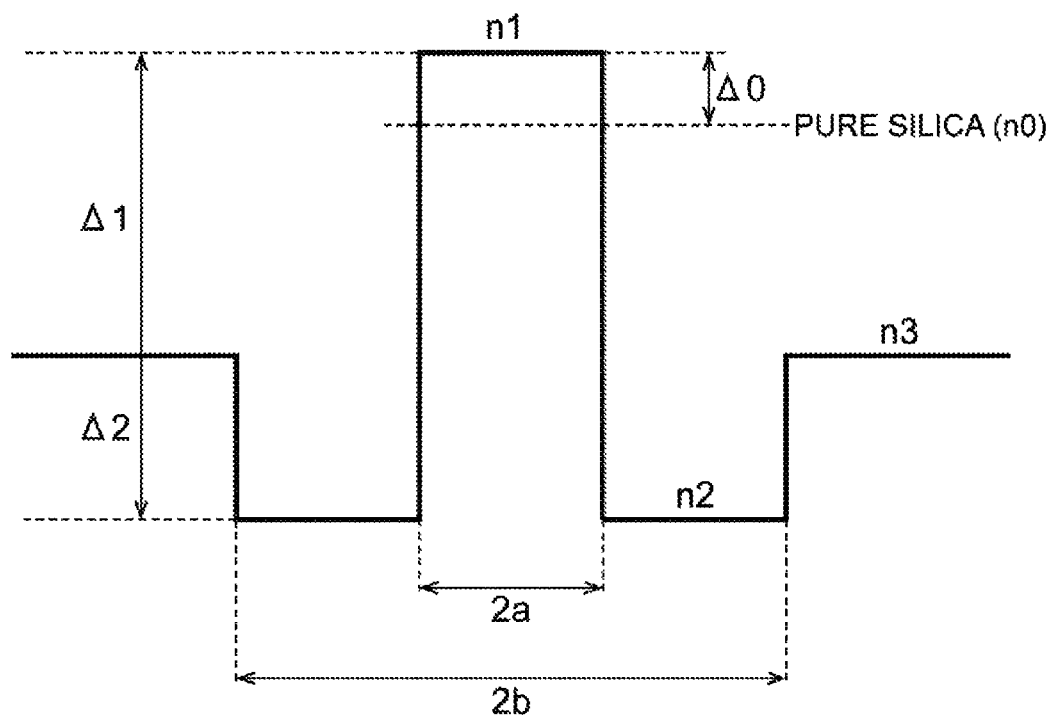
FIG. 6 is a diagram showing another example of a refractive index profile applicable to an optical fiber according to the present embodiment.
Figure 7A:
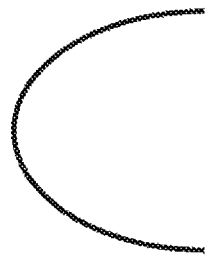
FIGS. 7A to 7F are diagrams showing a modified example of a refractive index profile of a core of an optical fiber according to the present embodiment.
Figure 7B:
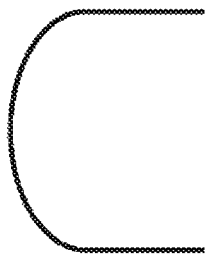
Figure 7C:
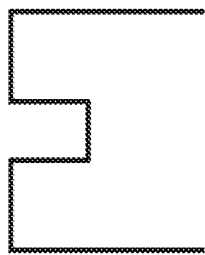
Figure 7D:
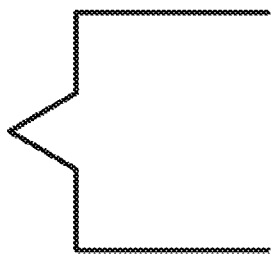
Figure 7E:
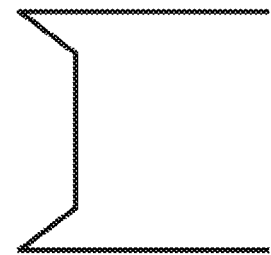
Figure 7F:
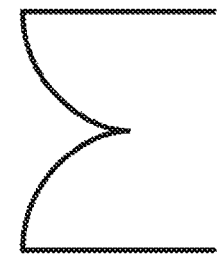

More preferably, an optical fiber of the embodiment has: a core having a refractive index n1 and a diameter 2a [µm] as the refractive index profile shown in FIG. 6; an inner cladding surrounding the core and having a refractive index n2 and a diameter of 2b [µm]; and an outer cladding surrounding the inner cladding and having a refractive index n3. A relative refractive index difference of the core with respect to the outer cladding is represented by Δ1 [%] (the following Formula (19)). A relative refractive index difference of the inner cladding with respect to the outer cladding is represented by Δ2 [%] (the following Formula (20)).

$$\Delta 1[\%]=100\times(n1-n3)/n1, \quad (19)$$

$$\Delta 2[\%]=100\times(n2-n3)/n2, \quad (20)$$

Further, it is preferable that the following Formula (21) be satisfied. Conditions 2 and 3 show that it is preferable that $\text{Aeff}_{1450}$ and $\text{Aeff}_{1550}$ be greater, and by using an optical fiber with such a refractive index profile, it is possible to increase Aeff to 100 µm² or more while keeping effective single mode conditions for the signal light and keeping the bending loss at a wavelength of 1550 nm to 20 dB/m or less when the optical fiber is wound to have a diameter of 20 mm.

$$n1 > n3 > n2 \quad (21)$$

Here, the effective single mode conditions mean that the fiber cutoff wavelength λc is 1600 nm or less. By satisfying the conditions, the cable cutoff wavelength can become the signal light wavelength or less (for example, C band: 1530 nm to 1565 nm).

Further, as shown in FIGS. 7A to 7F, it is possible to variously deform the refractive index profile of the core of a sample (optical fiber) applicable to the optical fiber according to the present embodiment. In such cases, the average value of the refractive index of the core is regarded to be n1.

FIG. 1A shows the configuration of the optical transmission system 1 equipped with the optical fiber transmission line using the optical fiber according to the present embodiment. In the optical transmission system 1, it is preferable that the following Formula (22) be satisfied, when the span length is represented by L [km], and the pumping light power is represented by $P_{Pump}$ [mW]. By satisfying Formula (22), the above Formula (8) shows that $G_E$ can be reduced by 1 dB or more in the optical transmission system 1 according to the present embodiment compared with the optical transmission system using a standard single mode fiber; therefore, it is possible to reduce $P_{ASE\_EDFA}$ by 1 dB or more and thus to improve the OSNR.

$$\alpha_{SdB} \cdot L - \frac{0.11}{Aeff_P \cdot \alpha_P} \cdot P_{Pump} < 0.19L - 0.028 P_{Pump} - 1 \quad (22)$$

Further, in the optical transmission system 1 equipped with the optical fiber transmission line using the fiber according to the present embodiment, it is preferable that the following Formula (23) be satisfied. By satisfying Formula (23), the relationship $G_R < G_E$ is satisfied based on the above Formula (4) and the above Formula (8); thus, it is possible to suppress the increase in $P_{ASE\_Raman}$ and thus to improve the OSNR.

$$\frac{0.11}{Aeff_P \cdot \alpha_P} \cdot P_{Pump} < \alpha_{SdB} \cdot L - \frac{0.11}{Aeff_P \cdot \alpha_P} \cdot P_{Pump} \quad (23)$$

Figure 8:
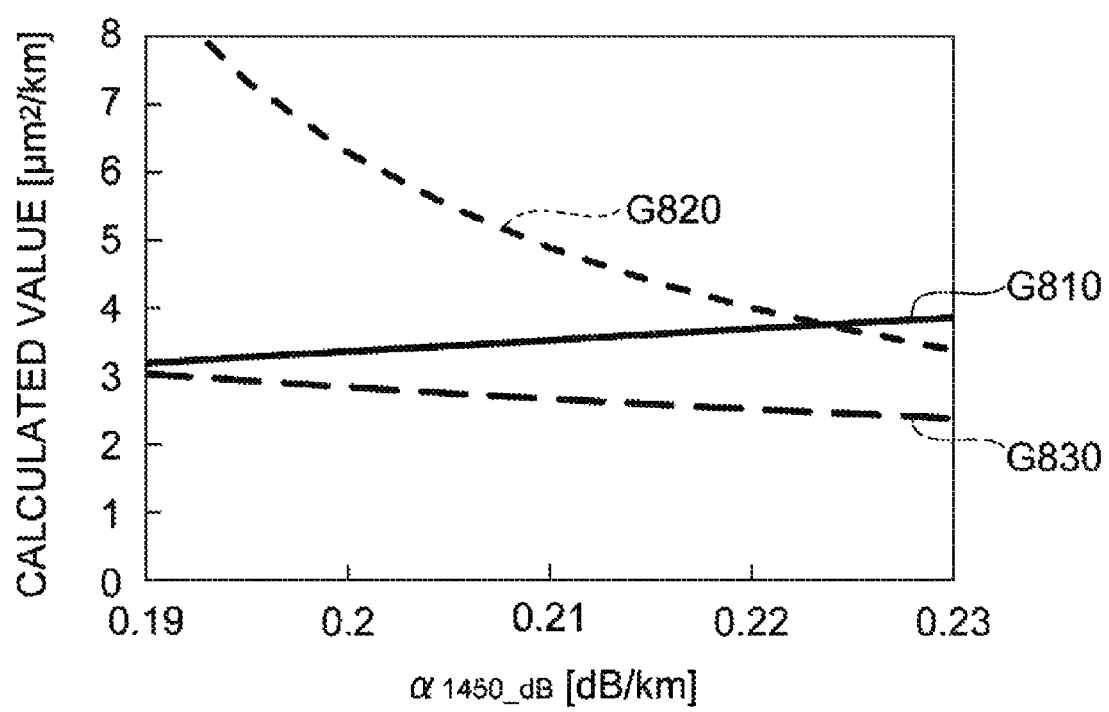
FIG. 8 is a graph showing dependence of each of $Aeff_{1450} \cdot \alpha_{1450}$, $22/(\alpha_{1550\_dB} \times 100 - 12)$, and $0.44/\alpha_{1550\_dB}$ on $\alpha_{1450\_dB}$ under predetermined conditions.

Next, with reference to FIGS. 8 and 9, a description will be given on each of appropriate ranges of the transmission loss $\alpha_{1450\_dB}$ at a wavelength of 1450 nm and the effective area $\text{Aeff}_{1450}$ at a wavelength of 1450 nm. Note that the prepared optical fibers (which have the refractive index profile shown in FIG. 5 or FIG. 6). Specifically, FIG. 8 is a graph showing the dependency of each of $\text{Aeff}_{1450} \cdot \alpha_{145}$, $22/(\alpha_{1550\_dB} \times 100-12)$, and $0.44/\alpha_{1550\_dB}$ on $\alpha_{1450\_dB}$ under the conditions that $\text{Aeff}_{1450}$ is made to be 73 µm² and $\alpha_{1550\_dB}$ is made to be $\alpha_{1450\_dB}$–0.045 [dB/km]. Further, FIG. 9 is a graph showing the dependency of each of $\text{Aeff}_{1450} \cdot \alpha_{1450}$, $22/(\alpha_{1550\_dB} \times 100-12)$, and $0.44/\alpha_{1550\_dB}$ on $\text{Aeff}_{1450}$ under the condition that $\alpha_{1550\_dB}$ is made to be 0.155 dB/km and $\alpha_{1450}$ is made to be 0.045 dB/km.

Figure 9:
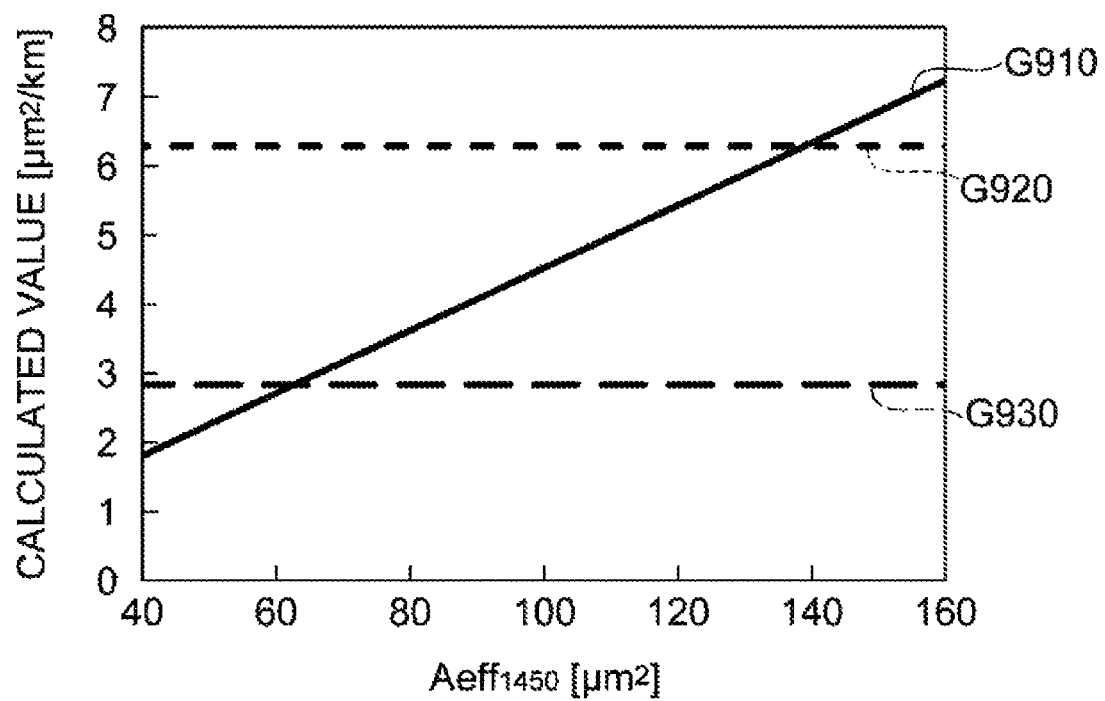
FIG. 9 is a graph showing dependence of each of $Aeff_{1450} \cdot \alpha_{1450}$, $22/(\alpha_{1550\_dB} \times 100 - 12)$, and $0.44/\alpha_{1550\_dB}$ on $Aeff_{1450}$ under predetermined conditions.

Note that $\text{Aeff}_{1450} \cdot \alpha_{1450}$ is represented by graph G810 in FIG. 8 and graph G910 in FIG. 9, which are each the left member of each of the above Formula (15) and Formula (16). The member $22/(\alpha_{1550\_dB} \times 100-12)$ is the right member of the above Formula (15), where the right member is represented by each of graph G820 in FIG. 8 and graph G920 in FIG. 9. Further, $0.44/\alpha_{1550\_dB}$ is the right member of the above Formula (16), where the right member is represented by each of graph G830 in FIG. 8 and graph G930 in FIG. 9.

As understood from FIG. 8, if $\alpha_{1450\_dB}$ is in the range from 0.19 to 0.22 dB/km, Condition 1 represented by the above Formula (15) and Condition 2 represented by the above Formula (16) are satisfied. On the other hand, as understood from FIG. 9, if $\text{Aeff}_{1450}$ is in the range from 60 µm² to 140 µm², Condition 1 and Condition 2 respectively represented by the above Formula (15) and the above Formula (16) are both satisfied.

REFERENCE SIGNS LIST

1: Optical transmission system, 10: Transmitter, 20: Repeater, 21: EDFA, 22: Pumping light source for Raman-amplification, 30: Receiver, 40: Optical fiber

The invention claimed is:
1. An optical transmission system comprising:
an optical fiber transmission line using an optical fiber, the optical fiber comprising:
  a core extending along a predetermined axis; and a cladding provided on an outer periphery of the core,
  wherein each of the core and the cladding is configured to satisfy the following formula:

$$\frac{0.44}{\alpha_{1550\_dB}} < Aeff_{1450} \cdot \alpha_{1450} < \frac{22}{\alpha_{1550\_dB} \cdot 100 - 12}$$

where $\text{Aeff}_{1450}$ [µm²] is an effective area at a wavelength of 1450 nm;
$\alpha_{1450}$ [/km] is a transmission loss at a wavelength of 1450 nm; and
$\alpha_{1550}$ dB [dB/km] is a transmission loss at a wavelength of 1550 nm;
an Er-doped optical fiber amplifier which is configured to amplify signal light transmitted through the optical fiber transmission line; and a Raman amplifier which is configured to Raman-amplify the signal light transmitted through the optical fiber transmission line, wherein the following formula is satisfied:

$$\frac{0.11}{Aeff_p \cdot \alpha_P} \cdot P_{Pump} < \alpha_{SdB} \cdot L - \frac{0.11}{Aeff_p \cdot \alpha_P} \cdot P_{Pump} < 0.19L - 0.028 P_{Pump} - 1$$

where $Aeff_p$ [μm$^2$] is an effective area of the optical fiber at a wavelength of pumping light for Raman amplification; $\alpha_p$ [/km] is a transmission loss of the optical fiber transmission line at the wavelength of the pumping light for Raman amplification; $\alpha_{SdB}$ [dB/km] is a transmission loss of the optical fiber transmission line at a signal light wavelength; L is a span length [km] of the optical fiber transmission line; and $P_{pump}$ [mW] is a pumping light power.

2. The optical fiber according to claim 1, wherein each of the core and the cladding is configured to satisfy the following formula:

$$Aeff_{1150} \cdot \alpha_{1150} > 2.2$$

where $Aeff_{1550}$ [μm$^2$] is an effective area at a wavelength of 1550 nm;
and $\alpha_{1550}$ [km] is a transmission loss at a wavelength of 1550 nm.

3. The optical fiber according to claim 1, wherein the transmission loss $\alpha_{1550\_dB}$ at a wavelength of 1550 nm is 0.17 dB/km or less.

4. The optical fiber according to claim 1, wherein an effective area $Aeff_{1550}$ at a wavelength of 1550 nm is 70 μm$^2$ to 160 μm$^2$.

5. The optical fiber according to claim 1, wherein a transmission loss $\alpha_{1450\_dB}$ at a wavelength of 1450 nm is 0.19 dB/km to 0.22 dB/km.

6. The optical fiber according to claim 1, wherein the effective area $A_{eff1450}$ at a wavelength of 1450 nm is 60 μm$^2$ to 140 μm$^2$.

7. The optical fiber according to claim 1, wherein a relative refractive index difference of the core with respect to pure silica is −0.1% to +0.1%.

8. The optical fiber according to claim 7, wherein a relative refractive index difference of the core with respect to a reference area of the cladding is 0.18% to 0.45%, and a diameter of the core is 9 μm to 15 μm.

9. The optical fiber according to claim 1, wherein a fiber cutoff wavelength is 1600 nm or less.

10. The optical fiber according to claim 9, wherein the cladding includes: an inner cladding surrounding the outer peripheral surface of the core; and an outer cladding surrounding an outer peripheral surface of the inner cladding,
wherein a refractive index of the outer cladding is smaller than a refractive index of the core and is greater than a refractive index of the inner cladding.

11. The optical fiber according to claim 10, wherein a ratio b/a of a diameter 2a of the core to an outer diameter 2b of the inner cladding is 3.0 to 5.0.

* * * * *